(12) United States Patent
Silvi et al.

(10) Patent No.: US 6,352,654 B1
(45) Date of Patent: Mar. 5, 2002

(54) CONDUCTIVE POLYPHENYLENE ETHER-POLYAMIDE COMPOSITIONS AND METHOD FOR THEIR PREPARATION

(75) Inventors: Norberto Silvi, Clifton Park; William R. Haaf, Voorheesville; Mark Giammattei, Selkirk; Robert Hossan, Albany, all of NY (US); Thomas J. Stanley, Montgomery, AL (US); William D. Richards, Scotia, NY (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 09/705,052

(22) Filed: Nov. 2, 2000

Related U.S. Application Data

(60) Continuation of application No. 09/097,190, filed on Jun. 12, 1998, now Pat. No. 6,171,523, which is a division of application No. 08/818,991, filed on Mar. 17, 1997, now Pat. No. 5,843,340.

(51) Int. Cl.$^7$ ................................................. H01B 1/24
(52) U.S. Cl. ........................ 252/511; 524/495; 524/910
(58) Field of Search ......................... 252/511; 524/495, 524/496, 847, 910

(56) References Cited

U.S. PATENT DOCUMENTS

| | | | |
|---|---|---|---|
| 4,404,125 A | 9/1983 | Abolins et al. | 252/511 |
| 4,566,990 A | 1/1986 | Liu et al. | 252/503 |
| 4,596,670 A | 6/1986 | Liu | 252/511 |
| 4,600,741 A | 7/1986 | Aycock et al. | 524/139 |
| 4,659,760 A | 4/1987 | van der Meer | 524/141 |
| 4,929,388 A | 5/1990 | Wessling | 252/500 |
| 4,974,307 A | 12/1990 | Uebayashi et al. | 29/460 |
| 5,075,035 A | 12/1991 | Ueki et al. | 252/511 |
| 5,371,134 A | 12/1994 | Inoue | 525/495 |
| 5,373,039 A | 12/1994 | Sakai et al. | 524/100 |
| 5,484,838 A | 1/1996 | Helms et al. | 524/496 |
| 6,107,415 A * | 8/2000 | Silvi et al. | 525/397 |

FOREIGN PATENT DOCUMENTS

| | | |
|---|---|---|
| EP | 237948 | 9/1987 |
| EP | 381056 | 1/1989 |
| EP | 506386 | 9/1992 |
| EP | 618267 | 10/1994 |
| EP | 635527 | 12/1995 |
| EP | A-0618267 | 1/2000 |
| JP | 8919630 | 8/1990 |
| WO | WO 94/23433 | 11/1994 |

* cited by examiner

Primary Examiner—Mark Kopec

(57) ABSTRACT

Conductive polyphenylene ether-polyamide compositions having excellent ductility are prepared by melt blending polyphenylene ether, an unsaturated impact modifying polymer and a functionalizing compound in an initial step, optionally in combination with a portion of the polyamide, and subsequently melt blending with the remainder of the polyamide and conductive carbon black having a low volatiles content. A mixture of polyamides, illustrated by mixtures of polyamide-6 and polyamide-66, is employed.

13 Claims, No Drawings

CONDUCTIVE POLYPHENYLENE ETHER-POLYAMIDE COMPOSITIONS AND METHOD FOR THEIR PREPARATION

This application is a continuation of application Ser. No. 09/097,190, filed Jun. 12, 1998 now U.S. Pat. No. 6,171,523 which is a division of application Ser. No. 08/818,991, filed Mar. 17, 1997, now U.S. Pat No. 5,843,340.

BACKGROUND OF THE INVENTION

This invention relates to electrically conductive resin blends and methods for preparing them. More particularly, it relates to the preparation of conductive blends which are ductile and have excellent paint adhesion.

Blends of polyphenylene ethers and polyamides are currently in wide use for the fabrication of such articles as exterior body parts for automobiles. Their use in such areas is particularly advantageous by reason of the combination of the excellent properties of polyphenylene ethers, which include temperature stability and impact resistance, with those of polyamides, which include solvent resistance. It is known that polyphenylene ether-polyamide blends containing more than a rather low minimum threshold proportion of polyamide are incompatible unless special compatibilization steps are taken, and therefore such blends are usually prepared with the addition of a suitable compatibilizing compound.

It is also well known that external automobile parts must be painted. In recent years, electrostatic powder coating methods of painting are becoming more widely used by reason of their convenience and environmental advantages, particularly minimization of volatile emissions. For powder coating to be successful, it is necessary for the resinous article to have a relatively high surface electrical conductivity.

U.S. Pat. No. 5,484,838 describes a method of increasing thermal conductivity by incorporating electrically conductive carbon black into a polymer blend. Similarly, Japanese Kokai 2/201,811 describes the incorporation of conductive carbon black into polyphenylene ether-polyamide compositions, and more particularly into the polyamide continuous phase thereof. A further constituent of such polyphenylene ether-polyamide compositions is usually an impact modifier, most often a block copolymer of styrene and a diene such as butadiene or isoprene which block copolymer may be subsequently hydrogenated. As described, the conductive compositions are prepared by first blending the carbon black with the polyamide and subsequently introducing the polyphenylene ether, impact modifier and compatibilizer, optionally in combination with polystyrene.

In another known method for producing conductive blends, the initial step combines the polyphenylene ether, compatibilizer and impact modifiers and the polyamide and carbon black are then individually added, typically at successive downstream addition ports in an extruder. This method has the advantage that formation of the compatibilized polyphenylene ether-polyamide blend precedes addition of the carbon black, improving blend morphology.

It has been discovered, however, that such blends are frequently characterized by low ductility; i.e., they are brittle. Moreover, adhesion of electrostatically deposited paints to such blends is erratic. It appears that there are chemical differences between the paints employed in Europe, for example, and those employed in the United States in that the former but not the latter have uniformly high adhesion to the surface of the resin blend.

It is of interest, therefore, to provide electrically conductive polyphenylene ether-polyamide blends with improved ductility and improved adhesion to a wide variety of electrostatically applied paints.

SUMMARY OF THE INVENTION

The present invention provides conductive resin blends and a method for making them. Said resin blends have the desired high ductility and excellent adhesion to diverse types of electrostatic powder coatings, including those employed in many regions of the world. They may be prepared in a single pass through a melt blending apparatus such as an extruder.

In one of its aspects, the invention is a method for preparing a conductive resinous composition which comprises:

I. melt blending, to form a first resin blend:
  (A) a polyphenylene ether resin;
  (B) at least one impact modifying polymer comprising at least 40% by weight of ethylenically unsaturated structural units; and
  (C) an effective proportion of a non-polymeric functionalizing compound capable of reacting in the melt with polyphenylene ethers and polyamides; and II. melt blending said first resin blend with
  (D) a polyamide composition comprising (i) at least 20% by weight of at least one polyamide consisting essentially of structural units of the formula $$-NH-R^1-CO- \qquad (I)$$

with any balance being (ii) at least one polyamide consisting essentially of structural units of the formula $$-NH-R^2-NH-CO-R^3-CO-, \qquad (II)$$

wherein each of $R^{1-3}$ is an alkylene radical, said polyamide introduced in this step being in particulate form; and
  (E) an effective proportion of conductive carbon black having a volatiles content less than 1.0% by weight;
  to form a final resin blend comprising polyamide as a continuous phase and polyphenylene ether, impact modifying polymer and carbon black as one or more dispersed phases, said final resin blend having a bulk electrical resistivity of at most 200 KOhm-cm and, in the falling dart impact test, a total energy at 23° C. of at least 48 joules and a failure mode other than fully brittle; the weight ratio of reagent D to the combination of reagents A, B and C in said final resin blend being at least about 0.75.

Another aspect of the invention is conductive polyphenylene ether-polyamide compositions prepared by the above-described method.

DETAILED DESCRIPTION; PREFERRED EMBODIMENTS

The polyphenylene ethers employed as reagent A according to the present invention (the term "reagent" being employed herein without regard to whether a chemical reaction involving said material actually occurs) are known polymers comprising a plurality of structural units of the formula

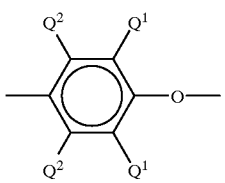

(I)

wherein in each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-1,4-phenylene ether units. Suitable copolymers include random copolymers containing such units in combination with (for example) 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

The polyphenylene ether has an intrinsic viscosity greater than about 0.25, most often in the range of about 0.25–0.6 and especially 0.4–0.6 dl/g, as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

Reagent B, the impact modifying polymer, may be any polymer known to improve the impact strength of polyphenylene ether-polyamide blends, provided it contains at least 40% and preferably at least 60% by weight of ethylenically unsaturated structural units; i.e., units in the polymer chain (mers) which contain ethylenically unsaturated carbon-carbon bonds. Such units are most often derived from dienes such as butadiene and isoprene. Examples of suitable polymers are high impact polystyrene; polydienes such as polyisoprene and polybutadiene; styrene-diene block copolymers including diblock and triblock copolymers in which the diene structural units are not entirely hydrogenated; and core-shell polymers having unsaturated rubbery cores and stiff shells with carboxylic acid groups or functional derivatives thereof (e.g., anhydride, ester, amide or imide groups). The preferred impact modifiers are those free from carboxylic acid groups or functional derivatives thereof, and especially the aforementioned styrene-diene block copolymers.

Reagent C, the functionalizing agent, may be any of several known non-polymeric compounds having functional groups, usually at least two thereof, capable of reaction in the melt with polyphenylene ethers and/or polyamides, thereby forming copolymeric molecules. Such groups include carboxylic acid, anhydride, amide, ester, ortho ester, epoxide, olefin, halotriazine, phosphate, hydroxy and amino groups. Preferably, reagent C contains at least one group capable of reacting with each of reagents A and D. Illustrative functionalizing compounds include maleic anhydride, fumaric acid, citric acid and glycidyl methacrylate, with citric acid often being preferred.

Reagent D is a polyamide composition comprising polyamide-6, i.e., poly(e-aminocaproamide), or a mixture thereof with polyamide-66, i.e., poly (hexamethyleneadipamide). Said polyamide composition comprises at least 20% and preferably 25–60% by weight polyamide-6, whose presence is necessary to compensate in part for the loss of ductility resulting from the incorporation of carbon black. In other respects, the nature of the polyamide is not believed critical. Illustrative relative viscosities and amine end group concentrations thereof are in the ranges of about 25–60 and 35–130 µeq/g, respectively.

Reagent E is conductive carbon black having a volatiles content less than 1.0% by weight. It preferably has a surface area of at least about 900 and most preferably at least about 1100 m²/g. Commercially available carbon blacks which are suitable include Ketjen EC600 JD, manufactured by Akzo Chemicals. Other useful conductive materials include carbon fibrils such as those available from Hyperion Catalyst.

Step I of the method of this invention is the melt blending of reagents A, B and C. Any melt blending method, batch or continuous, may be employed. Most often, it is preferred to employ an extrusion procedure using a single screw or twin screw extruder, with the reagents being introduced through the feed throat of the extruder.

The proportions of reagents A, B and D are such as to provide a weight ratio of reagent D to the combination of reagents B and A in the final resin blend of at least about 0.7 and preferably about 0.9–1.25. Most often, reagent B constitutes about 5–20% and reagent C about 0.5–2.0% of the final resin blend.

The materials routinely blended in step I of the method of the invention are those which ultimately form the one or more dispersed phases of the final resin blend. It is also within the scope of the invention, and is frequently preferred, to incorporate a first portion comprising up to about 80%, preferably up to about 65%, of total reagent D in the first resin blend formed in step I. One effect of including said first portion of reagent D is optimization of the thermal stability of reagent B, which may degrade at blending temperatures if said first portion of reagent D is absent.

In step II, the first resin blend is melt blended with the remaining constituents including reagent E and the balance of reagent D. Reagent E may be introduced as a powder, but it is frequently convenient to introduce it as a concentrate in part of the second portion of reagent D, said concentrate typically comprising about 10–25% by weight of reagent E. The amount of reagent E employed is an amount necessary to afford a composition of the desired conductivity and is most often in the range of about 1.5–5.0 parts, preferably 2.0–3.0 parts, per 100 parts of final resin blend (phr).

Reagent proportions are adjusted so that the weight ratio of reagent D to the combination of reagents A, B and C in the final resin blend is at least about 0.75. Most often, it is in the range of 0.75–1.1.

It is important, particularly when reagents D and E are introduced separately, that the portion of reagent D introduced in step II be in particulate form, i.e., as powder rather than pellets. If this is not done, compositions of very low conductivity are generally produced.

Other materials may be incorporated in the resin blend during step I, II or both. Such materials may include stabilizers for the polyamide or for the entire composition. Typical blending set temperatures are in the range of about 250–300° C. Vacuum venting during extrusion may be employed.

The method of this invention is particularly advantageous because it can reliably produce compositions having excellent ductility and high electrical conductivity. In particular, bulk electrical resistivities of at most 200 and usually at most 100 kOhm-cm and, in the falling dart impact test, total energies at 23° C. of at least 48 and usually at least 50 joules, combined with ductilities characterizable as better than fully brittle, are typical of the compositions of the invention.

The invention is illustrated by the following examples. All parts and percentages are by weight. The polyphenylene ether employed was a poly(2,6-dimethyl-1,4-phenylene ether) having an intrinsic viscosity (in chloroform at 25° C.) of 0.46 dl/g. The impact modifier was a styrene-butadiene-styrene triblock copolymer comprising about 30% styrene units. The polyamide-6 species employed had relative viscosities of about 40 and amine end croup concentrations in the range of 88–120 meq/g.

EXAMPLES 1–12

Compatibilized polyphenylene ether-polyamide blends were prepared by extrusion in twin-screw corotating extruders having screws of standard design. Each extruder was fitted with an upstream feed throat and a downstream feed port; the upstream portion was atmospherically vented and the downstream portion vacuum vented.

Polyphenylene ether, impact modifier, citric acid and a portion of the polyamide-6 employed were introduced through the upstream feed port, and carbon black, the remainder of the polyamide and in certain specified examples within Tables I, II, and III a minor proportion of lubricant/densifying agent were added downstream. Small proportions of stabilizers were also incorporated in the blend; experience has shown that the stabilizers and lubricant/densifying agent have no effect on the ductility or conductivity properties of the blends. Extrusion temperatures were in the range of 275–293° C.

The extrudates were injection molded into test specimens and notched Izod impact strength (ASTM method D256), falling dart (Dynatup) impact strength (ASTM method D3763) and tensile elongation were determined. Failure mode in the falling dart impact test varies from fully brittle (1) to fully ductile (5).

Bulk electrical resistivity tests were run on portions of the tensile test specimens, after snapping off the ends of the bars. The ends were painted with electrically conducting paint and resistances were determined with a multimeter and converted to bulk resistivities by multiplying by the quotient of the area and length of the specimen.

The results for the compositions of the invention are given in Tables I and II. Table III gives comparable results for various control samples which varied from the invention in such parameters as presence or absence of carbon black, presence or absence of polyamide-6, weight ratio of continuous to dispersed phase, physical state of polyamide introduced downstream and proportion and order of introduction of carbon black. Impact results were determined in English units and converted to metric units.

TABLE I

|  | Example | | | | | | | |
| --- | --- | --- | --- | --- | --- | --- | --- | --- |
|  | 1[1] | 2 | 3 | 4 | 5 | 6 | 7 | 8[1] |
| Densifying agent added | yes | yes | yes | yes | no | yes | yes | no |
| (A) Polyphenylene ether, % | 36.0 | 36.0 | 36.0 | 36.0 | 36.0 | 36.0 | 36.0 | 36.0 |
| (B) Impact modifier, % | 15.1 | 15.1 | 15.1 | 15.1 | 15.1 | 15.1 | 15.1 | 15.0 |
| (C) Citric acid, % | 0.7 | 0.7 | 0.7 | 0.7 | 0.7 | 0.7 | 0.7 | 0.7 |
| (D) Polyamide-6, % | 12.0 | 24.1 | 24.1 | 16.1 | 12.0 | 24.1 | 24.1 | 26.1 |
| (D) Polyamide-66, % | 36.1 | 24.1 | 24.1 | 32.1 | 36.1 | 24.1 | 24.1 | 22.2 |
| (E) Carbon black, phr | 2.5 | 2.5 | 2.25 | 2.5 | 2.5 | 2.5 | 2.76 | 2.75 |
| Wt. ratio, D:(A + B + C) | 0.93 | 0.93 | 0.93 | 0.93 | 0.93 | 0.93 | 0.93 | 0.94 |
| Polyamide upstream, % of total: | | | | | | | | |
| Polyamide-6 | 100 | 50 | 50 | 100 | 100 | 50 | 50 | 46 |
| Polyamide-66 | 0 | 0 | 0 | 0 | 0 | 0 | 0 | 0 |
| Total polyamide | 25 | 25 | 25 | 33.3 | 25 | 25 | 25 | 25 |
| Carbon black in concentrate, %[3] | 0 | 0 | 0 | 0 | 11.3 | 10.3 | 10.3 | 11.0 |
| Izod impact strength, joules/m | 243 | 464 | 336 | 214 | 192 | 240 | 256 | 263 |
| Tensile elongation, % | 66 | 85 | 78 | 83 | 70 | 61 | 73 | 80 |

TABLE I-continued

| | Example | | | | | | | |
|---|---|---|---|---|---|---|---|---|
| | 1[1] | 2 | 3 | 4 | 5 | 6 | 7 | 8[1] |
| Falling dart impact: | | | | | | | | |
| Total energy, joules | 52.2 | 54.2 | 58.3 | 50.2 | 56.3 | 50.2 | 48.8 | 56.6 |
| Failure mode | 4 | 2 | 2 | 2 | 2 | 4 | 4 | 4 |
| Bulk resistivity, KOhm-cm | 35 | 58 | 168 | 13 | 53 | 177 | 53 | 10 |

[1]Average of 2 readings.
[2]Average of 4 readings.
[3]Based on concentrate.

TABLE II

| | Examples | | | |
|---|---|---|---|---|
| | 9 | 10 | 11 | 12 |
| Densifying agent added | yes | yes | yes | yes |
| (A) Polyphenylene ether, % | 40.1 | 36.0 | 34.0 | 37.9 |
| (B) Impact modifier, % | 15.1 | 15.1 | 14.2 | 10.6 |
| (C) Citric acid, % | 0.7 | 0.7 | 0.7 | 0.7 |
| (D) Polyamide-6, % | 11.0 | 48.7 | 11.4 | 25.4 |
| (D) Polyamide-66, % | 33.1 | — | 39.8 | 25.4 |
| (E) Carbon black, phr | 2.5 | 2.5 | 2.66 | 2.6 |
| Wt. ratio, D:(A + B + C) | 0.79 | 0.93 | 1.05 | 1.03 |
| Polyamide upstream, % of total: | | | | |
| Polyamide-6 | 100 | 25 | 100 | 50 |
| Polyamide-66 | 0 | — | 0 | 0 |
| Total polyamide | 25 | 25 | 22.2 | 25 |
| Carbon black in concentrate, % | 0 | 0 | 0 | 0 |
| Izod impact strength, joules/m | 262 | 470 | 235 | 240 |
| Tensile elongation, % | 56 | 106 | 65 | 46 |
| Falling dart impact: | | | | |
| Total energy, joules | 43.4 | 58.3 | 57.0 | 52.9 |
| Failure mode | 3 | 5 | 2 | 4 |
| Bulk resistivity, KOhm-cm | 13 | 23 | 29 | 98 |

It will be apparent from the tables that the compositions of the invention all have or closely approach the desired physical and electrical properties, and that many have the preferred properties.

Several conclusions can be drawn from the control samples listed in Table III. First, Controls 1 and 2 in which carbon black was not present had excellent physical properties. On the other hand, Controls 3 and 5, having varying reagent proportions and containing no polyamide-6, had the desired bulk resistivity properties but poor ductility. Control 4, in which all of the polyamide-6 was introduced downstream as pellets, had an undesirably high bulk resistivity. The same property was seen in Control 6, additionally having a relatively low proportion of carbon black, and Controls 7 and 8 in which the carbon black was introduced upstream.

EXAMPLE 13

A composition similar to that of Example 1 was powder coated with a PPG paint formulation in common use in the United States. The paint adhered well to the resin. A control sample in which the unsaturated impact modifier was replaced by a mixture of fully hydrogenated, and therefore saturated, polymers of otherwise similar structures showed very poor paint adhesion.

TABLE III

| | Control | | | | | | | |
|---|---|---|---|---|---|---|---|---|
| | 1 | 2 | 3 | 4 | 5 | 6 | 7 | 8 |
| Densifying agent added? | no | no | yes | yes | no | yes | no | no |
| (A) Polyphenylene ether, % | 46.8 | 36.0 | 39.7 | 36.0 | 46.8 | 36.0 | 39.9 | 39.9 |
| (B) Impact modifier, % | 11.8 | 15.1 | 11.5 | 15.1 | 11.8 | 15.1 | 15.0 | 15.0 |
| (C) Citric acid, % | 0.6 | 0.7 | 0.6 | 0.7 | 0.6 | 0.7 | 1.0 | 1.0 |
| (D) Polyamide-6, % | 0 | 12.0 | 0 | 12.0[5] | 0 | 24.1[5] | 22.0 | 22.0 |
| (D) Polyamide-66, % | 40.8 | 36.1 | 48.2 | 36.1 | 40.8 | 24.1 | 22.0 | 22.0 |
| (E) Carbon black, phr | 0 | 0 | 2.5 | 2.5 | 2.6 | 2.26 | 2.5[6] | 2.5[6] |
| Wt. ratio, D:(A + B + C) | 0.69 | 0.93 | 0.93 | 0.93 | 0.69 | 0.93 | 0.79 | 0.79 |
| Polyamide upstream, % of total: | | | | | | | | |
| Polyamide-6 | 0 | 100 | — | 0 | 0 | 50 | 50 | 100 |
| Polyamide-66 | 25 | 0 | 25 | 33.3 | 25 | 0 | 0 | 100 |
| Total polyamide | 25 | 25 | 25 | 25 | 25 | 25 | 25 | 100 |
| Carbon black in concentrate, % | 0 | 0 | 0 | 0 | 10.3 | 10.3 | 0 | 0 |
| Izod impact strength, joules/m | 331 | 603 | 139 | 288 | 107 | 411 | 155 | 64 |
| Tensile elongation, % | 120 | 84 | 30 | 65 | 19 | 73 | 32 | 13 |
| Falling dart impact: | | | | | | | | |
| Total energy, joules | 57.0 | 55.6 | 17.6 | 55.6 | 4.1 | 54.2 | 8.1 | 2.7 |
| Failure mode | 4 | 5 | 1 | 3 | 1 | 5 | 1 | 1 |
| Bulk resistivity, KOhm-cm | — | — | 3 | THTM[4] | 5 | 1339 | THTM | 397 |

[4]Too high to measure.
[5]Introduced as pellets, all downstream in Control 4.
[6]Introduced upstream.

What is claimed is:

1. A conductive polyphenylene ether-polyamide composition prepared by a method which comprises:
   I. melt blending, to form a first resin blend:
      (A) a polyphenylene ether resin;
      (B) at least one impact modifying polymer comprising at least 40% by weight of ethylenically unsaturated structural units; and
      (C) an effective proportion of a non-polymeric functionalizing compound capable of reacting in the melt with polyphenylene ethers and polyamides; and
   II. melt blending said first resin blend with
      (D) a polyamide composition comprising (i) at least 20% by weight of at least one polyamide consisting essentially of structural units of the formula

—NH—R¹—CO—   (I)

with any balance being (ii) at least one polyamide consisting essentially of structural units of the formula

—NH—R²—NH—CO—R³—CO—,   (II)

wherein each of $R^{1-3}$ is an alkylene radical, said polyamide introduced in this step being in powder form; and
      (E) an effective proportion of conductive carbon fibrils; to form a final resin blend comprising polyamide as a continuous phase and polyphenylene ether, impact modifying polymer and carbon fibrils as one or more dispersed phases, said final resin blend having an Izod notched impact strength of at least 214 Joules/meter, and, in the falling dart impact test, a total energy at 23° C. of at least 48 joules and a failure mode other than fully brittle; the weight ratio of reagent D to the combination of reagents A, B and C in said final resin blend being at least about 0.75.

2. The composition of claim 1, wherein the final resin blend has a bulk electrical resistivity of at most 100 KOhm-cm and a total energy of at least 50 joules in the falling dart impact test.

3. The composition of claim 1, wherein the polyphenylene ether is a poly(2,6-dimethyl-1,4-phenylene ether).

4. The composition of claim 1, wherein reagent B is a styrene-diene diblock or triblock copolymer.

5. The composition of claim 1, wherein reagent C is citric acid.

6. The composition of claim 1, wherein reagent D(i) is a polyamide-6 and reagent D(ii) is a polyamide-66.

7. The composition of claim 6, wherein the weight ratio of reagent D to the combination of reagents A, B and C in the final resin blend is in the range of about 0.75–1.25.

8. The composition of claim 6, wherein the proportion of reagent B is at least about 5% based on final resin blend.

9. The composition of claim 6, wherein step I further comprises melt blending at least one polyamide, wherein the amount of polyamide in step I is up to about 75% by weight of the total amount of polyamide of step II.

10. The composition of claim 6, wherein reagent E is introduced as a concentrate in part of said second portion of reagent D.

11. The composition of claim 6, wherein the proportion of reagent E is in the range of about 1.5–5.0 parts 100 parts of resin blend.

12. The composition of claim 4, wherein the proportion of reagent E is in the range of about 2.0–3.0 parts per 100 parts of final blend.

13. A conductive polyphenylene ether-polyamide composition prepared by a method which comprises:
   I. melt blending, to form a first resin blend:
      (A) a polyphenylene ether resin;
      (B) at least one impact modifying polymer comprising at least 40% by weight of ethylenically unsaturated structural units; and
      (C) an effective proportion of a non-polymeric functionalizing compound capable of reacting in the melt with polyphenylene ethers and polyamides; and
   II. melt blending said first resin blend with
      (D) a polyamide composition comprising (i) at least 20% by weight of at least one polyamide consisting essentially of structural units of the formula

—NH—R¹—CO—   (I)

with any balance being (ii) at least one polyamide consisting essentially of structural units of the formula

—NH—R²—NH—CO—R³—CO—,   (II)

wherein each of $R^{1-3}$ is an alkylene radical, said polyamide introduced in this step being in powder form; and
      (E) an effective proportion of conductive carbon fibrils; to form a final resin blend comprising polyamide as a continuous phase and polyphenylene ether, impact modifying polymer and carbon fibrils as one or more dispersed phases, said final resin blend having a bulk electrical resistivity of at most 200 KOhm-cm, an Izod notched impact strength of at least 214 Joules/meter, and, in the falling dart impact test, a total energy at 23° C. of at least 48 joules and a failure mode other than fully brittle; the weight ratio of reagent D to the combination of reagents A, B and C in said final resin blend being at least about 0.75.

* * * * *